US011926501B2

(12) United States Patent
Tomioka et al.

(10) Patent No.: US 11,926,501 B2
(45) **Date of Patent: *Mar. 12, 2024**

(54) ACCOMMODATING DEVICE AND IMAGE FORMING APPARATUS WITH ACCOMMODATING UNIT

(71) Applicant: FUJIFILM Business Innovation Corp., Tokyo (JP)

(72) Inventors: Kota Tomioka, Kanagawa (JP); Hiroyuki Tanaka, Kanagawa (JP); Yoichi Yamakawa, Kanagawa (JP); Shinya Hasegawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 17/737,958

(22) Filed: May 5, 2022

(65) Prior Publication Data

US 2023/0159290 A1 May 25, 2023

(30) Foreign Application Priority Data

Nov. 19, 2021 (JP) ................................ 2021-188952

(51) Int. Cl.

| | |
|---|---|
| ***G03G 21/00*** | (2006.01) |
| ***B65H 1/04*** | (2006.01) |
| ***B65H 1/26*** | (2006.01) |
| ***B65H 5/00*** | (2006.01) |
| *G03G 21/16* | (2006.01) |

(52) U.S. Cl.

CPC ............... *B65H 5/006* (2013.01); *B65H 1/04* (2013.01); *B65H 1/266* (2013.01); *B65H 2405/35* (2013.01); *G03G 21/1695* (2013.01)

(58) Field of Classification Search

CPC .......... B65H 5/006; B65H 1/04; B65H 1/266

USPC ........................................................ 399/124

See application file for complete search history.

(56) References Cited

U.S. PATENT DOCUMENTS 8,714,544 B2 * 5/2014 Totsuka .................. B65H 1/00 271/164

11,614,709 B1 * 3/2023 Tomioka ............ G03G 21/1695 399/110

FOREIGN PATENT DOCUMENTS

JP 2003312870 11/2003

* cited by examiner

*Primary Examiner* — Quana Grainger

(74) *Attorney, Agent, or Firm* — JCIPRNET

(57) ABSTRACT

An accommodating device includes a device body, an accommodating unit that is movable to a supply position where a user is able to supply a medium by being pulled out from the device body in a pulling direction and of which a centroid position is located on one side surface side with respect to a center in an intersecting direction with the pulling direction, a first expanding and contracting member that expands and contracts to connect the accommodating unit to the device body so as to be able to be pulled out and is fixed to one side surface of the accommodating unit in the intersecting direction, and a second expanding and contracting member that expands and contracts to connect the accommodating unit to the device body so as to be able to be pulled out and is fixed at a position higher than the first expanding and contracting member on the other side surface of the accommodating unit in the intersecting direction.

20 Claims, 10 Drawing Sheets

ACCOMMODATING DEVICE AND IMAGE FORMING APPARATUS WITH ACCOMMODATING UNIT

CROSS-REFERENCE TO RELATED APPLICATIONS

This application is based on and claims priority under 35 USC 119 from Japanese Patent Application No. 2021-188952 filed Nov. 19, 2021.

BACKGROUND

(i) Technical Field

The present invention relates to an accommodating device and an image forming apparatus.

(ii) Related Art

JP2003-312870A describes a configuration where a cassette portion of a paper feeding device is diagonally disposed, a cassette (for example, A3) in a maximum size is diagonally placed, and smaller cassettes are placed above and below the cassette.

SUMMARY

Aspects of non-limiting embodiments of the present disclosure relate to an accommodating device and an image forming apparatus that a user can supply a medium to an accommodating unit and a degree of freedom in providing the accommodating unit is increased compared to a case where expanding and contracting members are attached to the same height on both sides of the accommodating unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present invention, there is provided an accommodating device including a device body, an accommodating unit that is movable to a supply position where a user is able to supply a medium by being pulled out from the device body in a pulling direction and of which a centroid position is located on one side surface side with respect to a center in an intersecting direction with the pulling direction, a first expanding and contracting member that expands and contracts to connect the accommodating unit to the device body so as to be able to be pulled out and is fixed to one side surface of the accommodating unit in the intersecting direction, and a second expanding and contracting member that expands and contracts to connect the accommodating unit to the device body so as to be able to be pulled out and is fixed at a position higher than the first expanding and contracting member on the other side surface of the accommodating unit in the intersecting direction.

BRIEF DESCRIPTION OF THE DRAWINGS

Exemplary embodiment(s) of the present invention will be described in detail based on the following figures, wherein.

DETAILED DESCRIPTION

Examples of an accommodating device and an image forming apparatus according to an exemplary embodiment of the present invention will be described with reference to FIGS. 1 to 10. An arrow H shown in each drawing indicates an apparatus up-down direction, which is a vertical direction, an arrow D indicates an apparatus depth direction, which is a horizontal direction, and an arrow W indicates an apparatus width direction, which is a horizontal direction.

Overall Configuration of Image Forming Apparatus 10

Figure 1:
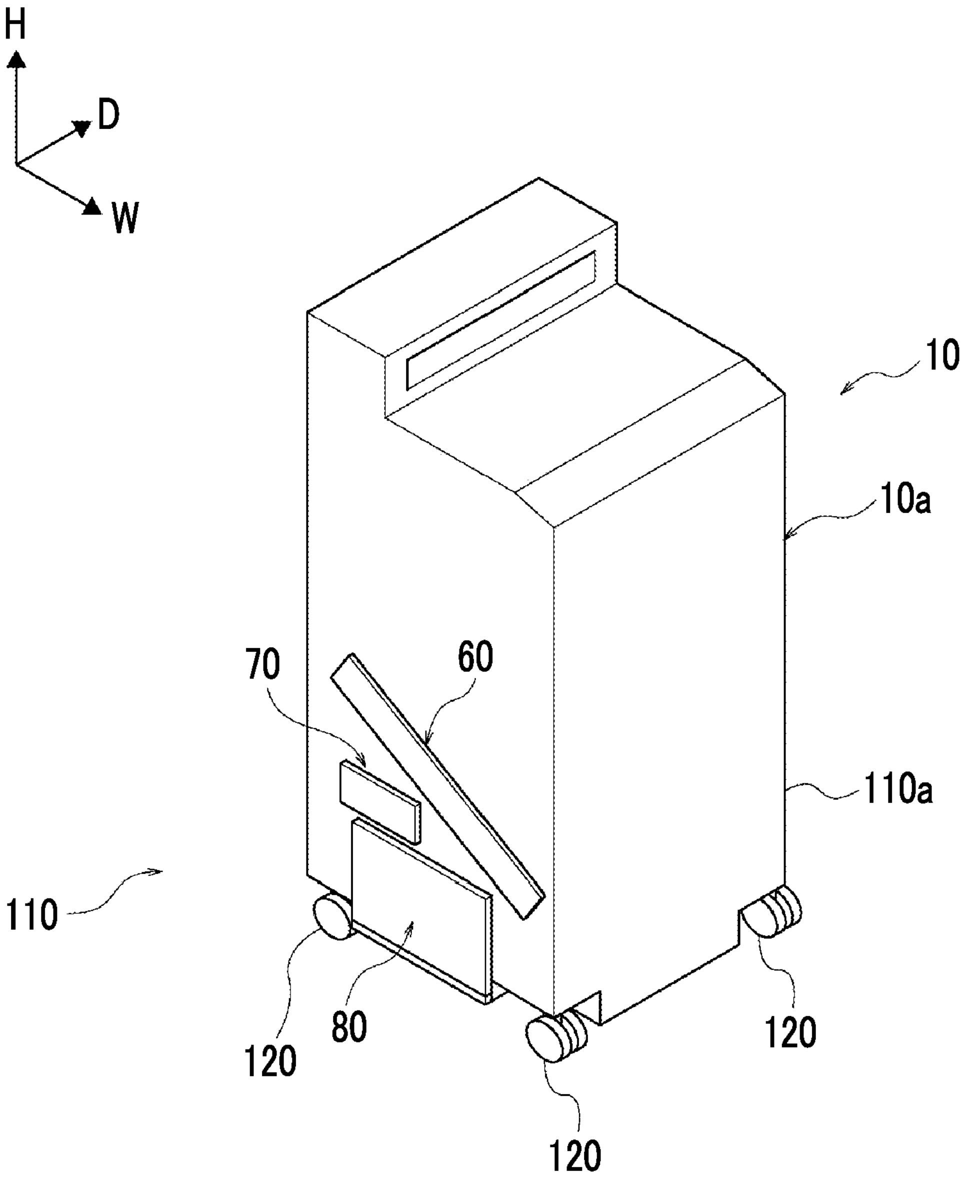
FIG. 1 is a perspective view showing an image forming apparatus according to an exemplary embodiment of the present invention.
Figure 2:
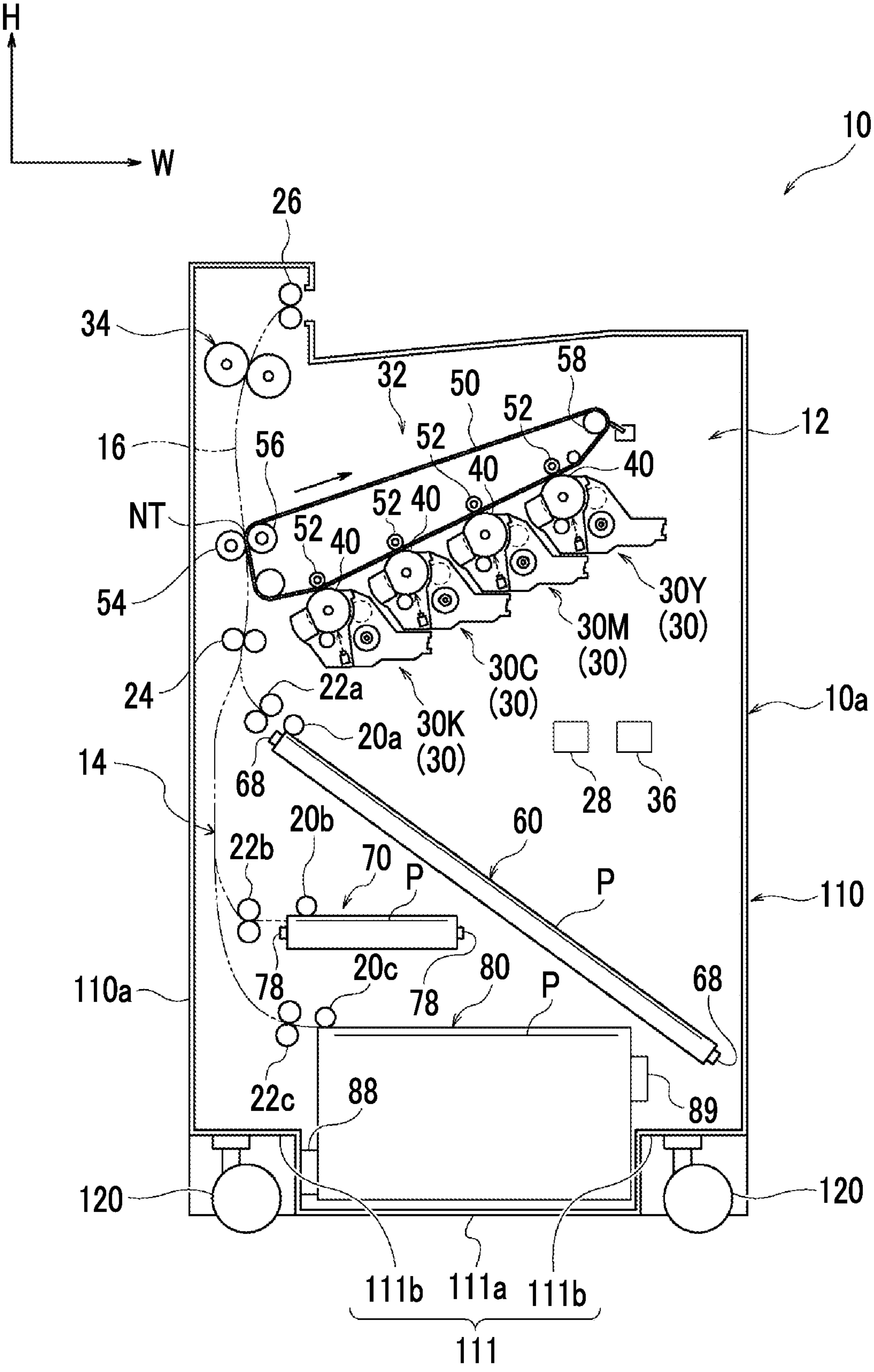
FIG. 2 is a schematic configuration view showing the image forming apparatus according to the exemplary embodiment of the present invention.

As shown in FIGS. 1 and 2, the image forming apparatus 10 includes an image forming unit 12 that forms a toner image through an electrophotographic method, an accommodating device 110 that has accommodating units 60, 70, and 80, which accommodate a transporting unit 14 transporting the medium P along a transport path 16 and a medium P. Further, the image forming apparatus 10 includes a control unit 28 that controls each unit and a main power supply 36 that supplies electric power of a commercial power supply to each unit.

In the image forming apparatus 10 having the configuration, the medium P is accommodated by the accommodating units 60, 70, and 80, and the medium P accommodated in any one of the accommodating units 60, 70, and 80 is transported along the transport path 16 by the transporting unit 14. Further, a toner image formed by the image forming unit 12 is formed on the transported medium P, and the medium P on which the toner image is formed is discharged to the outside of an apparatus body 10*a*.

Image Forming Unit 12

As shown in FIG. 2, the image forming unit 12 includes a plurality of toner image forming units 30 that form respective colors of toner images and a transfer unit 32 that transfers the toner images formed by the toner image forming units 30 to the medium P. Further, the image forming unit 12 includes a fixing device 34 that fixes the toner images, which are transferred to the medium P by the transfer unit 32, to the medium P.

Toner Image Forming Unit 30

The plurality of toner image forming units 30 are included to form a toner image for each color. In the present exemplary embodiment, in total, four colors of yellow (Y), magenta (M), cyan (C), and black (K) toner image forming units 30 are provided. In the following description, in a case where it is not necessary to distinguish between yellow (Y), magenta (M), cyan (C), and black (K), Y, M, C, and K attached to the reference numerals are omitted.

Figure 3:
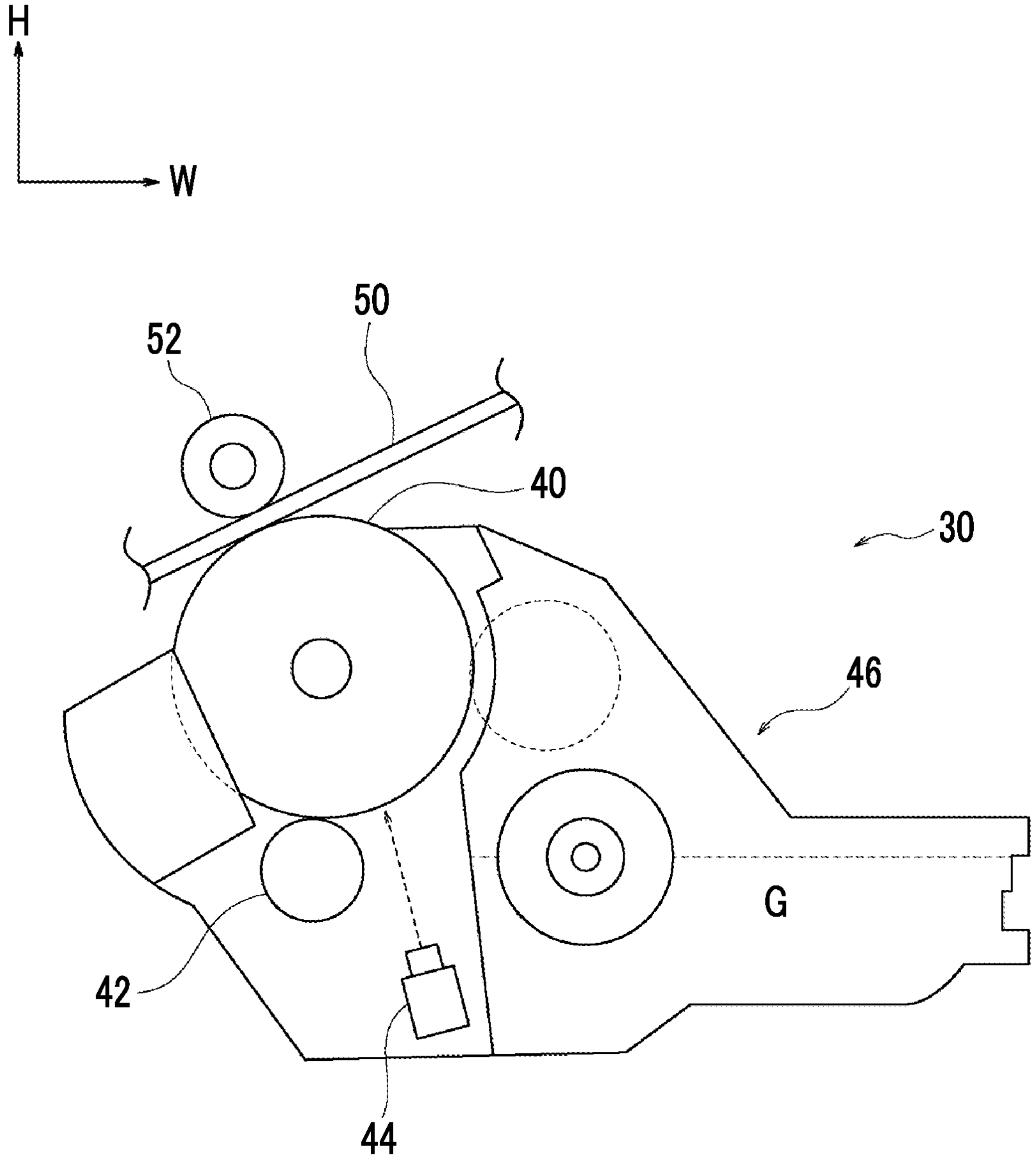
FIG. 3 is a configuration view showing an image forming unit of the image forming apparatus according to the exemplary embodiment of the present invention.

As shown in FIG. 3, the toner image forming unit 30 having each color is basically configured the same except for a toner to be used and includes a rotating cylindrical image holding body 40 and a charger 42 that charges the image holding body 40. Further, the toner image forming unit 30 includes an exposure device 44 that irradiates the charged image holding body 40 with exposure light and forms an electrostatic latent image and a developing device 46 that develops the electrostatic latent image with a developer G including a toner as a toner image. Accordingly, the toner image forming unit 30 having each color forms an image having each color using each color of toner.

In addition, as shown in FIG. 2, the image holding body 40 having each color is in contact with a transfer belt 50 (details to be described later) that moves around. In a circumferential direction (see an arrow in FIG. 2) of the transfer belt 50, the yellow (Y), magenta (M), cyan (C), and black (K) toner image forming units 30 are arranged side by side in turn from an upstream side.

Transfer Unit 32

As shown in FIG. 2, the transfer unit 32 includes the transfer belt 50 and primary transfer rollers 52 each of which is arranged on an opposite side of the image holding body 40 having each color with the transfer belt 50 sandwiched therebetween and transfers a toner image formed on the image holding body 40 having each color to the transfer belt 50.

In addition, the transfer unit 32 includes a winding roller 56 around which the transfer belt 50 is wound and a drive roller 58 around which the transfer belt 50 is wound and which transmits a rotational force to the transfer belt 50. Accordingly, the transfer belt 50 moves around in an arrow direction in FIG. 2.

Further, the transfer unit 32 includes a secondary transfer roller 54 that is arranged on the opposite side of the winding roller 56 with the transfer belt 50 sandwiched therebetween and transfers a toner image transferred to the transfer belt 50 to the medium P. A transfer nip NT where the toner image is transferred to the medium P is formed between the secondary transfer roller 54 and the transfer belt 50.

In the configuration, in order of yellow (Y), magenta (M), cyan (C), and black (K), the toner image is primarily transferred to the transfer belt 50 by the primary transfer roller 52. On the other hand, the toner image is transferred by the secondary transfer roller 54 from the transfer belt 50 to the medium P transported while being sandwiched between the transfer belt 50 and the secondary transfer roller 54. Further, the medium P on which the toner image is transferred is transported toward the fixing device 34.

Fixing Device 34

As shown in FIG. 2, the fixing device 34 is arranged on a downstream side of the transfer nip NT in a transport direction of the medium P. The fixing device 34 heats and pressurizes the toner image transferred to the medium P and fixes the toner image to the medium P.

Accommodating Device 110

As shown in FIG. 2, the accommodating device 110 includes the three accommodating units 60, 70, and 80 that are arranged at a lower portion of the image forming apparatus 10 and accommodate the medium P and the transporting unit 14 which transports the medium P. The accommodating unit 60 arranged at the uppermost is inclined with respect to the horizontal direction. Details of the accommodating device 110 will be described later.

Control Unit 28 and Main Power Supply 36

The control unit 28 and the main power supply 36 are arranged in a triangular region formed between the inclined accommodating unit 60 and the image forming unit 12.

Major Portion Configuration

Next, the accommodating device 110 will be described. As shown in FIGS. 1 and 2, the accommodating device 110 is arranged at the lower portion of the image forming apparatus 10. A device body 110*a* of the accommodating device 110 is formed integrally with the apparatus body 10*a* of the image forming apparatus 10.

Figure 4:
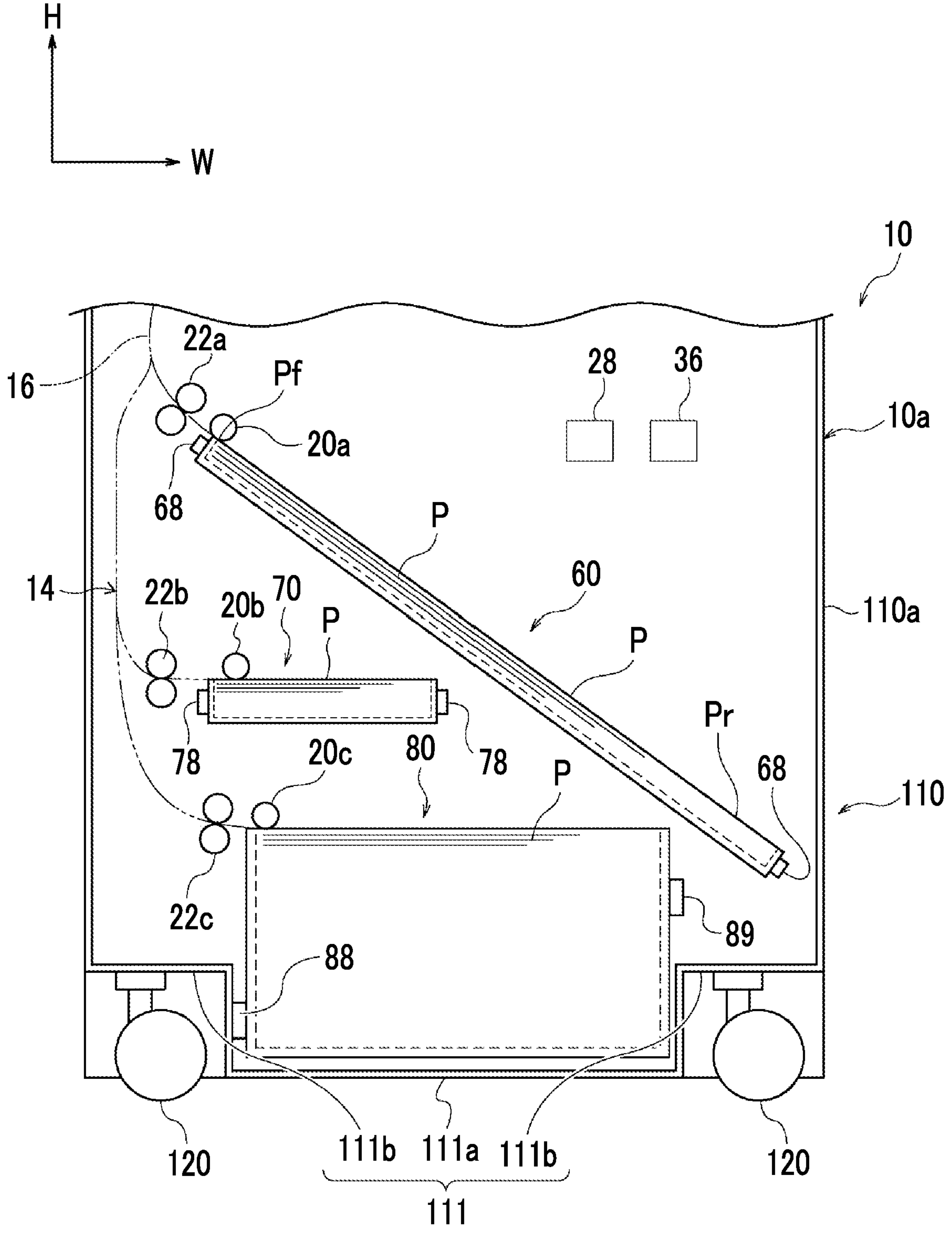
FIG. 4 is a configuration view showing an accommodating device according to the exemplary embodiment of the present invention.

As shown in FIG. 4, the accommodating device 110 includes the device body 110*a*, the accommodating unit 60 that accommodates the medium P, the accommodating unit 70 that accommodates the medium P, and the accommodating unit 80 that accommodates the medium P. In addition, the accommodating device 110 includes a slide rail 68 that makes the accommodating unit 60 capable of moving in the apparatus depth direction D, a slide rail 78 that makes the accommodating unit 70 capable of moving in the apparatus depth direction D, and a slide rail 88 that makes the accommodating unit 80 capable of moving in the apparatus depth direction D. The accommodating unit 60, the accommodating unit 70, and the accommodating unit 80 are arranged from an upper side to a lower side in this order.

In the present exemplary embodiment, for example, the accommodating unit 60 generally accommodates the A3 medium P, and the A3 medium P is the medium P in the maximum size that can be accommodated in the accommodating unit 60. In addition, the accommodating unit 70 generally accommodates the postcard-sized medium P, and the postcard-sized medium P is the medium P in the maximum size that can be accommodated in the accommodating unit 70. The accommodating unit 80 generally accommodates the A4 medium P, and the A4 medium P is the medium P in the maximum size that can be accommodated in the accommodating unit 80.

In addition, in the present exemplary embodiment, for example, the accommodating unit 60 can accommodate 200 media P, the accommodating unit 70 can accommodate 100 media P, and the accommodating unit 80 can accommodate 1,000 media P. In the image forming apparatus 10, it is assumed that the consumption of the A4 medium P is the largest. That is, the number of sheets that can be accommodated in the accommodating unit 80 accommodating the media P of which the consumption is the largest is larger than the number of sheets that can be accommodated in the accommodating unit 60 and the number of sheets that can be accommodated in the accommodating unit 70.

Castors 120 are attached to four corners of a lower surface 111 of the accommodating device 110. Attachment surfaces 111*b* for the castors 120 of the lower surface 111 of the accommodating device 110 are configured at positions higher than a center portion 111*a* of the lower surface 111 in the apparatus up-down direction H.

Transporting Unit 14

As shown in FIG. 2, the transporting unit 14 includes a feeding roller 20*a* that feeds the medium P accommodated in the accommodating unit 60 to the transport path 16 and a prevention roller 22*a* that prevents double-feeding of the media P fed by the feeding roller 20*a*.

In addition, the transporting unit 14 includes a feeding roller 20*b* that feeds the medium P accommodated in the accommodating unit 70 to the transport path 16 and a prevention roller 22*b* that prevents double-feeding of the media P fed by the feeding roller 20*b*.

Further, the transporting unit 14 includes a feeding roller 20*c* that feeds the medium P accommodated in the accommodating unit 80 to the transport path 16 and a prevention roller 22*c* that prevents double-feeding of the media P fed by the feeding roller 20*c*.

In addition, the transporting unit 14 includes an adjusting roller 24 that is arranged on the downstream side of the prevention rollers 22*a*, 22*b*, and 22*c* in the transport direction of the medium P and adjusts a timing when the medium P is fed to the transfer nip NT. Further, the transporting unit 14 includes a discharge roller 26 that discharges the medium P to which a toner image is fixed by the fixing device 34 to the outside of the apparatus body 10*a*.

Accommodating Unit 60 and Slide Rail 68

As shown in FIG. 4, the accommodating unit 60 has a box shape of which an upper side is open and accommodates a medium in the device body 110*a*. The accommodating unit 60 is another accommodating unit in the technique of the present invention. A pair of slide rails 68 are attached to both ends of the accommodating unit 60 in the apparatus width direction W respectively. The slide rail 68 includes an outer member, an intermediate member, and an inner member, the outer member is attached to the device body 110*a*, and the inner member is attached to the accommodating unit 60.

Accordingly, in a case where a user pulls out the accommodating unit 60 mounted on the device body 110*a* to a front side in the apparatus depth direction D, the accommodating unit 60 is guided by the slide rail 68 and is detached from the device body 110*a*. In addition, in a case where the user pushes in the accommodating unit 60 detached from the device body 110*a* to a back side in the apparatus depth direction D, the accommodating unit 60 is guided by the slide rail 68 and is mounted on the device body 110*a*.

In addition, as shown in FIG. 4, the accommodating unit 60 is inclined with respect to the horizontal direction such that vertical positions of one end (end portion on the left in FIG. 4) and the other end in the apparatus width direction are different from each other in a case of being viewed from the apparatus depth direction D in a state of being mounted on the device body 110*a* and a state of being detached from the device body 110*a*. Specifically, the accommodating unit 60 is inclined with respect to the horizontal direction such that the one end in the apparatus width direction is above the other end in a case of being viewed from the apparatus depth direction D. Herein, the one end and the other end are parts of the accommodating unit 60 and are one and the other of two points separated the most in the apparatus width direction.

In a state where the accommodating unit 60 is mounted on the device body 110*a*, the medium P accommodated in the accommodating unit 60 can be transported by the transporting unit 14. In other words, the accommodating unit 60 mounted on the device body 110*a* is located at a transport position where the accommodated medium P can be transported.

On the other hand, in a case where the user pulls out the accommodating unit 60 mounted on the device body 110*a* to the front side in the apparatus depth direction D, the accommodating unit 60 is guided by the slide rail 68, is abutted against a stopper (not shown) so as to be stopped, and is detached from the device body 110*a*. In addition, in a case where the user pushes in the accommodating unit 60 detached from the device body 110*a* to the back side in the apparatus depth direction D, the accommodating unit 60 is guided by the slide rail 68 and is mounted on the device body 110*a*. The detachment is a state where the medium P can be accommodated in the accommodating unit 60. In the present exemplary embodiment, a state where the accommodating unit 60 is detached from the device body 110*a* is a state where the accommodating unit 60 is not removed from the device body 110*a* and is supported by the device body 110*a* and is a state where the medium P can be accommodated in the accommodating unit 60.

Then, in a state where the accommodating unit 60 is detached from the device body 110*a*, an upper side of the accommodating unit 60 is opened, and the medium P can be supplied to the accommodating unit 60. In other words, the accommodating unit 60 detached from the device body 110*a* is located at a supply position where the medium P can be supplied to the accommodating unit 60.

Accommodating Unit 70 and Slide Rail 78

As shown in FIG. 4, the accommodating unit 70 has a box shape of which an upper side is open and accommodates a medium in the device body 110*a*. The accommodating unit 70 is another accommodating unit in the technique of the present invention. A pair of slide rails 78 are attached to both ends of the accommodating unit 70 in the apparatus width direction W respectively.

The slide rail 78 includes an outer member, an intermediate member, and an inner member, the outer member is attached to the device body 110*a*, and the inner member is attached to the accommodating unit 70.

Accordingly, in a case where the user pulls out the accommodating unit 70 mounted on the device body 110*a* to the front side in the apparatus depth direction D, the accommodating unit 70 is guided by the slide rail 78 and is detached from the device body 110*a*. In addition, in a case where the user pushes in the accommodating unit 70 detached from the device body 110*a* to the back side in the apparatus depth direction D, the accommodating unit 70 is guided by the slide rail 78 and is mounted on the device body 110*a*.

In addition, in a state of being mounted on the device body 110*a* and a state of being detached from the device body 110*a*, the accommodating unit 70 is horizontally arranged in a case of being viewed from the apparatus depth direction D. The fact that the accommodating unit 70 is horizontally arranged in the present exemplary embodiment may mean being arranged along the horizontal direction, and that is, for example, a state where the medium P accommodated in the accommodating unit 70 is allowed to be slightly inclined so as not to move due to the inclination.

Then, the accommodating unit 70 mounted on the device body 110*a* is located at the transport position where the accommodated medium P can be transported, and the accommodating unit 70 detached from the device body 110*a* is located at the supply position where the medium P can be supplied to the accommodating unit 70.

Accommodating Unit 80 and Slide Rails 88 and 89

As shown in FIGS. 4 to 7, the accommodating unit 80 has a box shape of which an upper side is open and accommodates the medium P in the device body 110*a*. The accommodating unit 80 is an accommodating unit in the technique of the present invention. A pair of slide rails 88 and 89 are attached to both ends of the accommodating unit 80 in the apparatus width direction W respectively. The slide rail 88 is fixed to one side surface 80*c* of the accommodating unit 80 in the apparatus width direction W. The slide rail 88 is a first expanding and contracting member in the technique of the present invention. The slide rail 89 is fixed to a position higher than the slide rail 88 on the other side surface 80*d* of the accommodating unit 80 in the apparatus width direction W. The slide rail 89 is a second expanding and contracting member in the technique of the present invention.

In the present exemplary embodiment, the apparatus depth direction D and a pulling direction B of the accommodating unit 80 are parallel to each other, a pulling direction B side in the apparatus depth direction D will be defined as an apparatus front side, and an opposite side to the pulling direction B in the apparatus depth direction D will be defined as an apparatus back side. In addition, the apparatus width direction W corresponds to an intersecting direction in the technique of the present invention. In the present exemplary embodiment, the fact that the apparatus depth direction D and the pulling direction B of the accommodating unit 80 are parallel to each other may mean that both are practically parallel to each other, and an angle difference between both directions is in a state of allowing an error of approximately ±5°.

Figure 5:
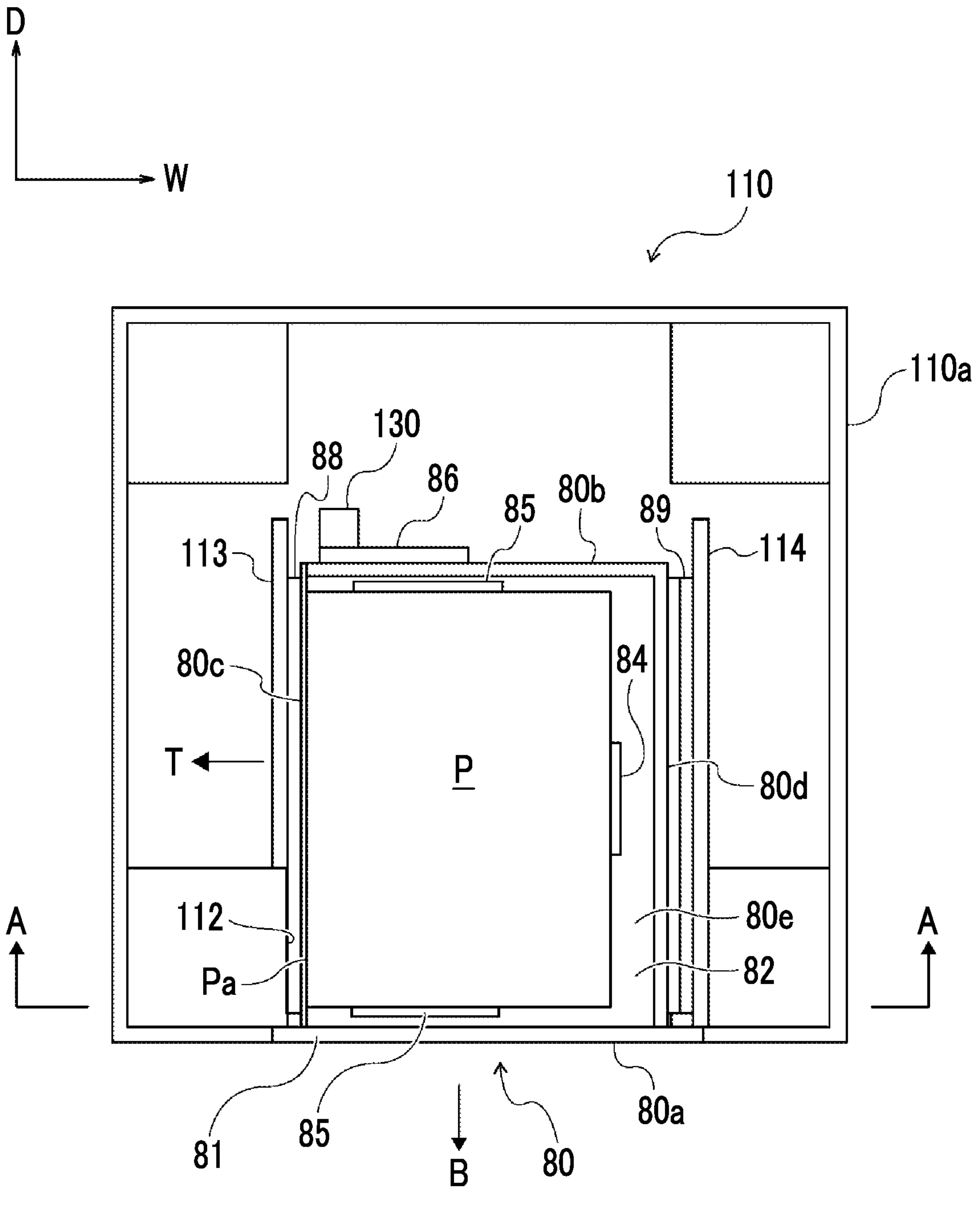
FIG. 5 is a schematic configuration view of an accommodating unit of the accommodating device according to the exemplary embodiment of the present invention and is a view showing a state where the accommodating unit is mounted on the accommodating device.
Figure 6:
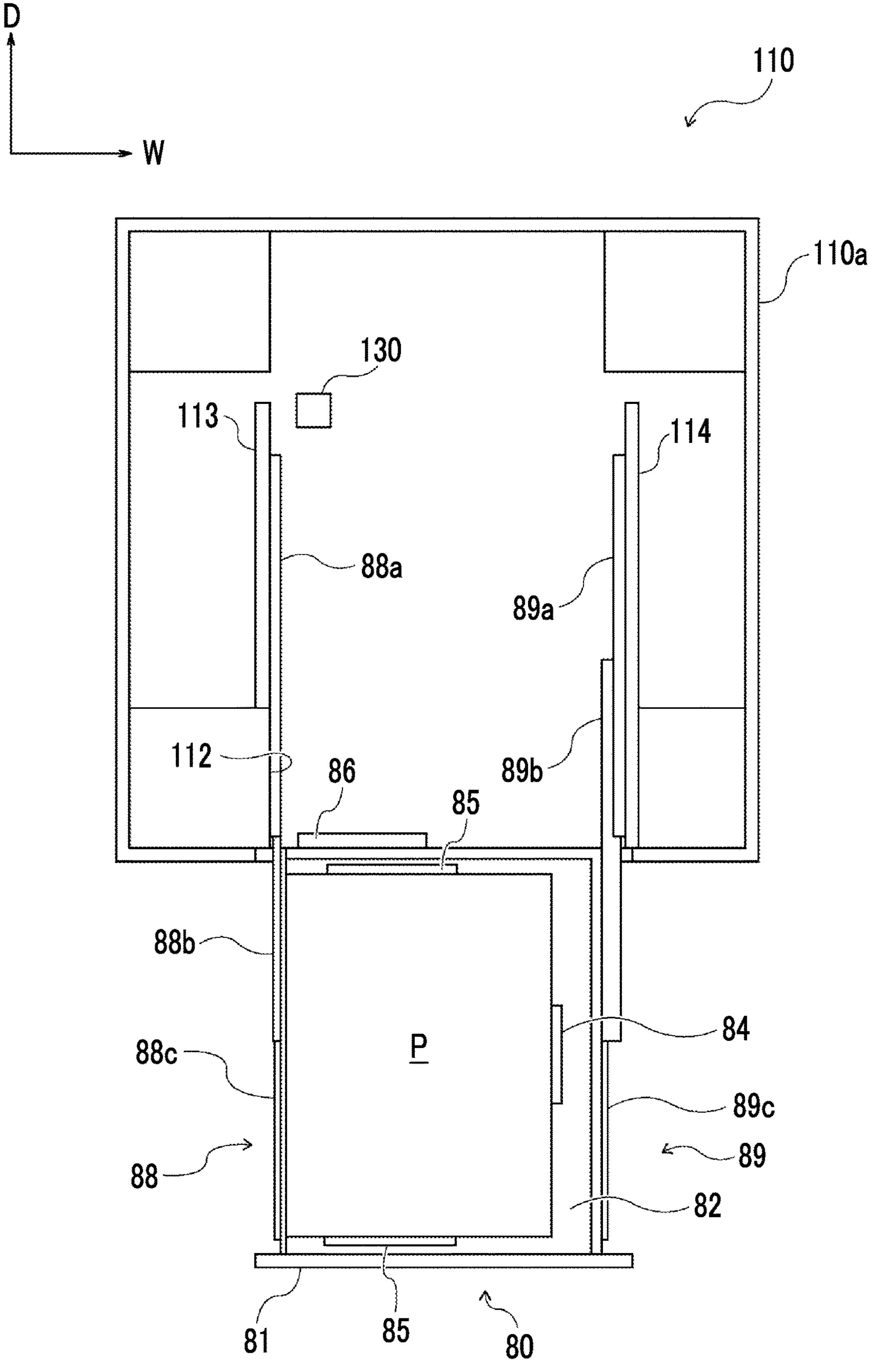
FIG. 6 is a schematic configuration view of the accommodating unit of the accommodating device according to the exemplary embodiment of the present invention and is a view showing a state where the accommodating unit is pulled out from the accommodating device.

By being pulled in the pulling direction B in a state of being mounted on the accommodating device 110 as shown in FIG. 5, the accommodating unit 80 comes into a state of being pulled out from the accommodating device 110 as shown in FIG. 6.

Figure 7:
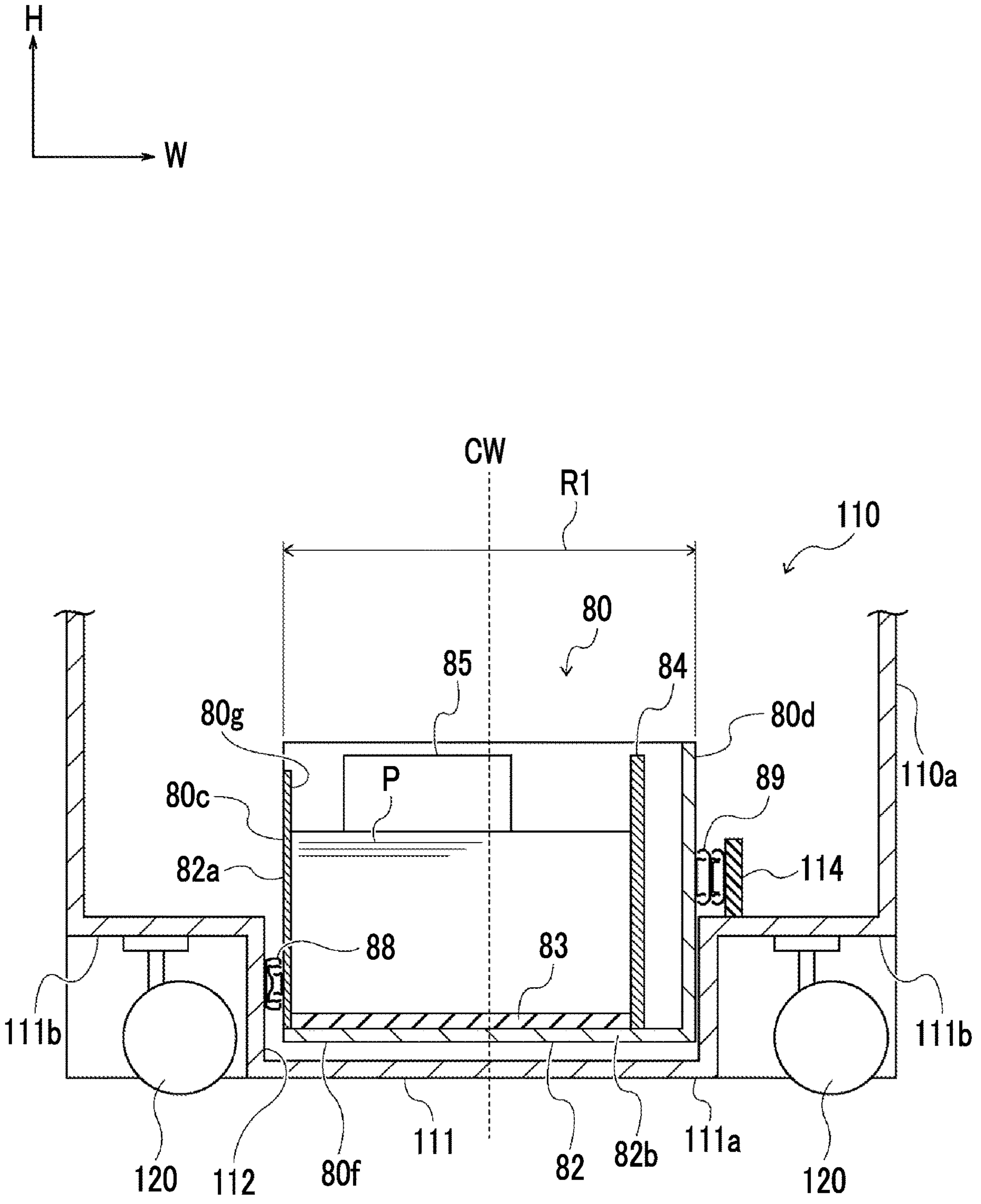
FIG. 7 is a cross-sectional view of the accommodating unit of the accommodating device according to the exemplary embodiment of the present invention and is a cross-sectional view taken along line A-A in FIG. 5.

As shown in FIGS. 5 to 7, the accommodating unit 80 includes a front panel 81, a medium holding unit 82, a medium holding plate 83 that is attached to the medium holding unit 82, an adjusting member 84 for adjusting an accommodated size of the medium P in the apparatus width direction W, two adjusting members 85 for adjusting the accommodated size of the medium P in the apparatus depth direction D, and a moving mechanism 86 for moving the medium P accommodated in the accommodating unit 80 upward in the vertical direction.

The front panel 81 is a panel exposed to a front surface of the accommodating device 110 in a state where the accommodating unit 80 is mounted on the accommodating device 110 and is configured of, for example, a resin.

The medium holding unit 82 is a box-shaped member of which an upper side where the medium P is provided is open and is configured such that a provision surface for the medium P is an upper surface 80*e* of the box-shaped accommodating unit 80. A panel of a side surface 82*a* of the medium holding unit 82 is formed of a metal, and the other portion 82*b* is formed of a resin. The side surface 82*a* of the medium holding unit 82 is a surface that is the one side surface 80*c* of the accommodating unit 80. That is, in the apparatus width direction W, a side wall of the one side surface 80*c* of the accommodating unit 80 is formed of a metal, and a side wall of the other side surface 80*d* is formed of a resin. Herein, examples of the metal forming the side wall of the side surface 80*c* include iron, stainless steel, aluminum, nickel, magnesium, titanium, copper, and alloys containing these metals. In addition, examples of the resin forming the side wall of the side surface 80*d* include polyethylene, polypropylene, vinyl chloride resin, an acrylonitrile butadiene style (ABS) resin, polycarbonate, and epoxy.

The medium holding plate 83 is a plate-shaped member that holds the medium P in the medium holding unit 82 and is attached to the medium holding unit 82 so as to be movable in the apparatus up-down direction H.

The adjusting member 84 is attached to the medium holding unit 82 so as to be movable in the apparatus width direction W. The two adjusting members 85 is attached to the medium holding unit 82 so as to be movable symmetrically in synchronization with a center position of an accommodation region of the medium P as reference in the apparatus depth direction D. The adjusting member 84 and the two adjusting members 85 are moved manually by the user.

The moving mechanism 86 is a mechanism for moving the medium P accommodated in the accommodating unit 80 upward in the vertical direction and bringing the medium P into contact with the feeding roller 20*c* and is attached to a position closer to the slide rail 88 than the slide rail 89 in the apparatus width direction W.

The moving mechanism 86 is realized by, for example, a gear mechanism including a plurality of gears. The gear mechanism, which is the moving mechanism 86, is connected to a drive unit 130 in the device body 110*a* in a state where the accommodating unit 80 is mounted on the accommodating device 110. The drive unit 130 is realized by, for example, a motor.

A rotation shaft of the motor and rotation shafts of the plurality of gears configuring the gear mechanism are both configured to be shafts parallel to the apparatus depth direction D. In addition, the medium holding plate 83 is connected to one of the rotation shafts of the gear mechanism by a wire. By rotating the gear mechanism with the motor and winding the wire attached to the one of the rotation shafts of the gear mechanism in a state where the accommodating unit 80 is mounted on the accommodating device 110, the medium holding plate 83 connected to the wire can be moved upward together with the medium P.

The accommodating unit 80 configured as described above is configured such that a centroid position is located on one side surface 80*c* side with respect to a center CW in the apparatus width direction W. The relationship is maintained even in a case where a maximum number of sheets of the media P having the maximum size, which can be accommodated, are accommodated in the accommodating unit 80.

In the present exemplary embodiment, the center CW of the accommodating unit 80 in the apparatus width direction W means a center of a body portion accommodating the medium P in the apparatus width direction W, excluding a panel of a front surface 80*a* and a panel of a back surface 80*b* in the accommodating unit 80. Specifically, as shown in FIG. 7, the center CW is a center position of a region R1 between the side surfaces 80*c* and 80*d*, which is the width of the body portion of the accommodating unit 80, which accommodates the medium P. In the present exemplary embodiment, the body portion of the accommodating unit 80 is configured by the medium holding unit 82. For this reason, the side surfaces 80*c* and 80*d* of the accommodating unit 80 in the apparatus width direction W are the same as both side surfaces of the medium holding unit 82 in the apparatus width direction W. However, in a case where another member is attached to the medium holding unit 82, an outermost position in the apparatus width direction W is a side surface, including the other member. Therefore, the position of "the center CW of the accommodating unit 80 in the apparatus width direction W" does not change depending on the shapes and sizes of the panel of the front surface 80*a* and the panel of the back surface 80*b* of the accommodating unit 80.

As shown in FIG. 7, the accommodating unit 80 is configured to accommodate the medium P by bringing the medium P into contact with an inner wall surface 80*g* on a slide rail 88 side with respect to the center CW of the accommodating unit 80 in the apparatus width direction W. The medium P is brought into contact with the feeding roller 20*c* by the moving mechanism 86 in a state where the accommodating unit 80 is mounted on the accommodating device 110, and is transported from the one side surface 80*c* side of the accommodating unit 80 along a transport direction T parallel to the apparatus width direction W.

In the present exemplary embodiment, the pulling direction B of the accommodating unit 80 and a side Pa of the medium P on a leading end side in the transport direction T are substantially parallel to each other. The side surface 80*c* of the accommodating unit 80 is a surface arranged along the side Pa of the medium P on the leading end side. The side surface 80*d* is a surface on an opposite side to the side surface 80*c* of the accommodating unit 80. In the present exemplary embodiment, the fact that the pulling direction B of the accommodating unit 80 and the side Pa of the medium P on the leading end side in the transport direction T are parallel to each other may mean that both are practically parallel to each other, and an angle difference between both directions is in a state of allowing an error of approximately ±5°.

Figure 8:
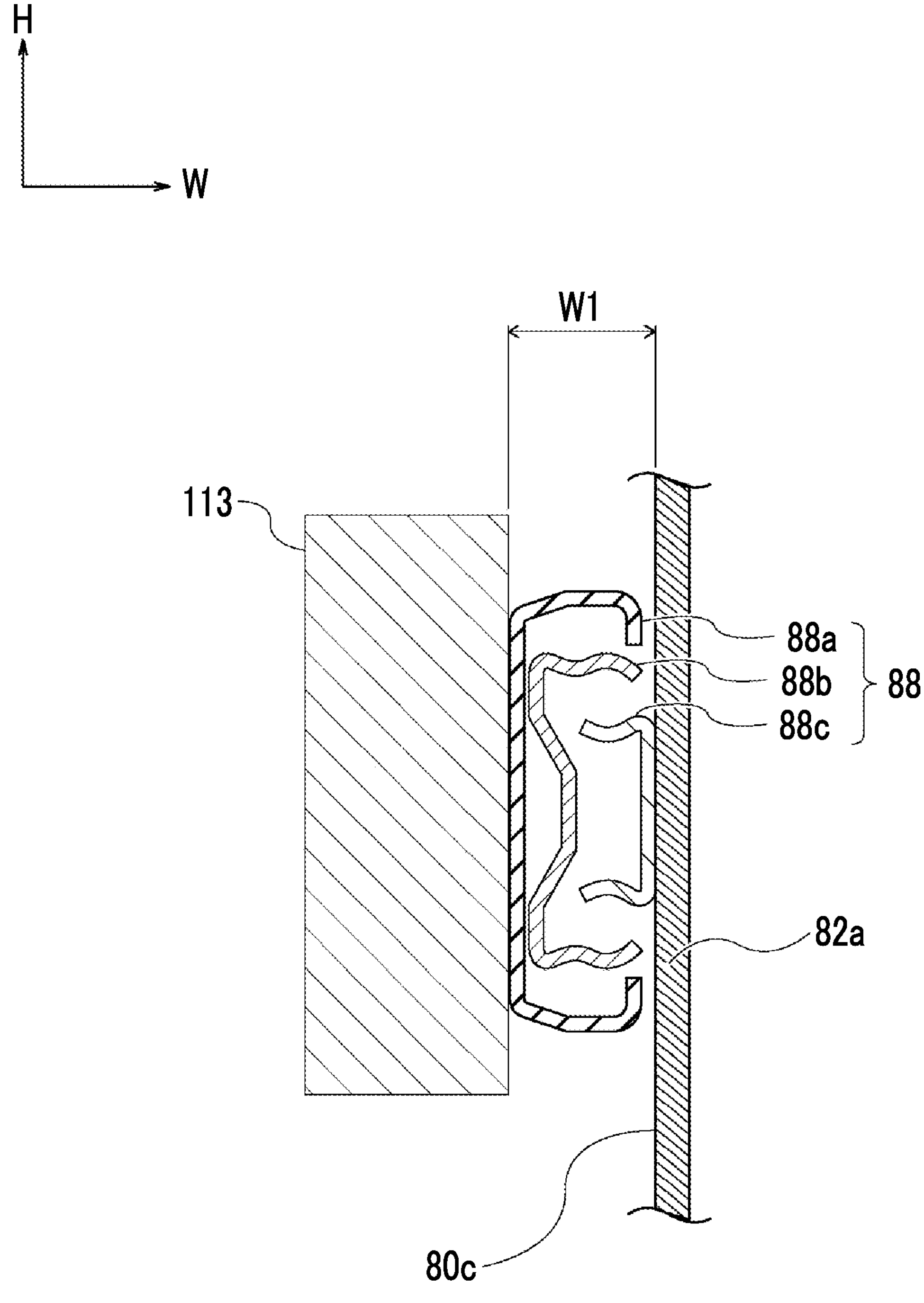
FIG. 8 is a schematic configuration view of a first expanding and contracting member of the accommodating unit of the accommodating device according to the exemplary embodiment of the present invention.

The slide rail 88 is an example of the first expanding and contracting member that expands and contracts to connect the accommodating unit 80 to the device body 110*a* so as to be able to be pulled out. As shown in FIG. 8, the slide rail 88 includes an outer member 88*a*, an intermediate member 88*b*, and an inner member 88*c*, the outer member 88*a* is fixed to an inner side surface 112 of a castor mounting portion in the device body 110*a* and a slide rail fixing portion 113, and the inner member 88*c* is attached to the one side surface 80*c* of the accommodating unit 80.

The outer member 88*a*, the intermediate member 88*b*, and the inner member 88*c* are each configured of one metal sheet. That is, the slide rail 88 includes three metal sheets as a whole. The slide rail 88 is configured to accommodate the intermediate member 88*b* and the inner member 88*c* in the outer member 88*a* in a state where the slide rail 88 is contracted.

Figure 9:
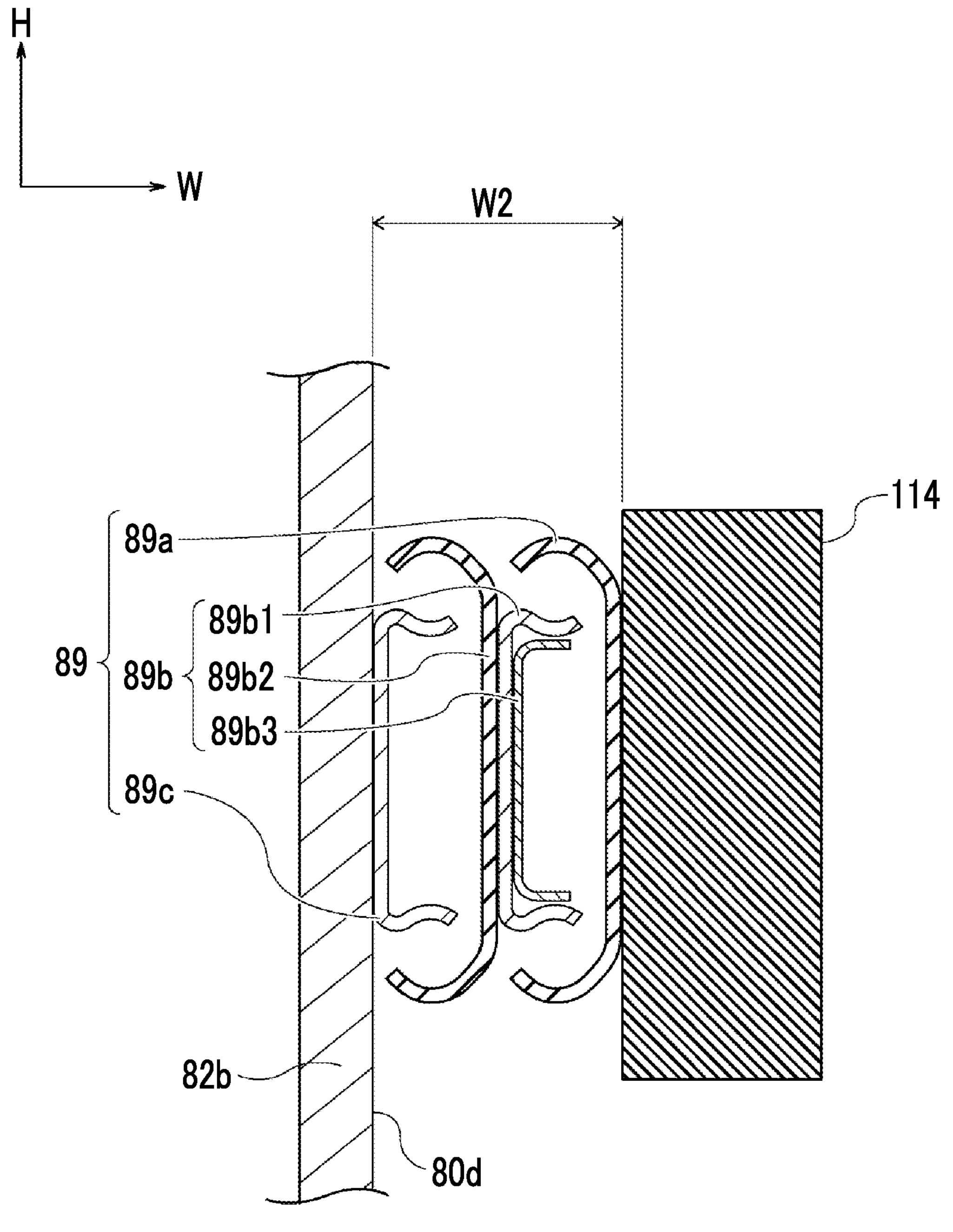
FIG. 9 is a schematic configuration view of a second expanding and contracting member of the accommodating unit of the accommodating device according to the exemplary embodiment of the present invention.

The slide rail 89 is an example of the second expanding and contracting member that expands and contracts to connect the accommodating unit 80 to the device body 110*a* so as to be able to be pulled out. As shown in FIG. 9, the slide rail 89 includes an outer member 89*a*, an intermediate member 89*b*, and an inner member 89*c*, the outer member 89*a* is fixed to a slide rail fixing portion 114 in the device body 110*a*, and the inner member 89*c* is attached to the other side surface 80*d* of the accommodating unit 80.

The outer member 89*a* and the inner member 89*c* are each configured of one metal sheet. The intermediate member 89*b* is configured in a form in which an inner member portion 89*b*1 formed of one metal sheet, an outer member portion 89*b*2 formed of one metal sheet, and a reinforcing member portion 89*b*3 formed of one metal sheet are integrated with each other. The reinforcing member portion 89*b*3 is a reinforcing member that extends parallel to the inner member portion 89*b*1 and the outer member portion 89*b*2 and is used for improving the rigidity of the entire intermediate member 89*b*. That is, the slide rail 89 includes five metal sheets as a whole.

In a state where the slide rail 89 is contracted, the slide rail 89 is configured such that the inner member portion 89*b*1 of the intermediate member 89*b* is accommodated in the outer member 89*a* and the inner member 89*c* is accommodated in the outer member portion 89*b*2 of the intermediate member 89*b*.

A withstanding load of the slide rail 89 is configured to be higher than a withstanding load of the slide rail 88. The number of metal sheets of the slide rail 89 is larger than the number of metal sheets of the slide rail 88. In addition, in the apparatus width direction W, a width W2 of the slide rail 89 is larger than a width W1 of the slide rail 88. All of these are beneficial configurations for making the withstanding load of the slide rail 89 higher than the withstanding load of the slide rail 88.

A lower surface 80*f* of the accommodating unit 80 is located below the attachment surfaces 111*b* for the castors 120 in the apparatus up-down direction H. In addition, the accommodating unit 80, the slide rail 88, and the castors 120 are arranged at positions overlapping each other in the apparatus up-down direction H. In addition, in a state where the medium P is accommodated in the accommodating unit 80, the accommodating unit 80, the medium P, the slide rail 88, and the castors 120 are arranged at positions overlapping each other in the apparatus up-down direction H.

With the configuration, in a case where the user pulls out the accommodating unit 80 mounted on the device body 110*a* in the pulling direction B, that is, to the front side in the apparatus depth direction D, the accommodating unit 80 is guided by the slide rails 88 and 89 and is detached from the device body 110*a*. In addition, in a case where the user pushes in the accommodating unit 80 detached from the device body 110*a* to the back side in the apparatus depth direction D, the accommodating unit 80 is guided by the slide rails 88 and 89 and is mounted on the device body 110*a*.

In addition, as shown in FIG. 4, in a state of being mounted on the device body 110*a* and a state of being detached from the device body 110*a*, the accommodating unit 80 is horizontally arranged in a case of being viewed from the apparatus depth direction D. The fact that the accommodating unit 80 is horizontally arranged in the present exemplary embodiment may mean being arranged along the horizontal direction, and that is, for example, a state where the medium P accommodated in the accommodating unit 80 is allowed to be slightly inclined so as not to move due to the inclination.

Then, the accommodating unit 80 mounted on the device body 110*a* is located at the transport position where the accommodated medium P can be transported, and the accommodating unit 80 detached from the device body 110*a* is located at the supply position where the medium P can be supplied to the accommodating unit 80.

Overall Configuration of Accommodating Device 110

Figure 10:
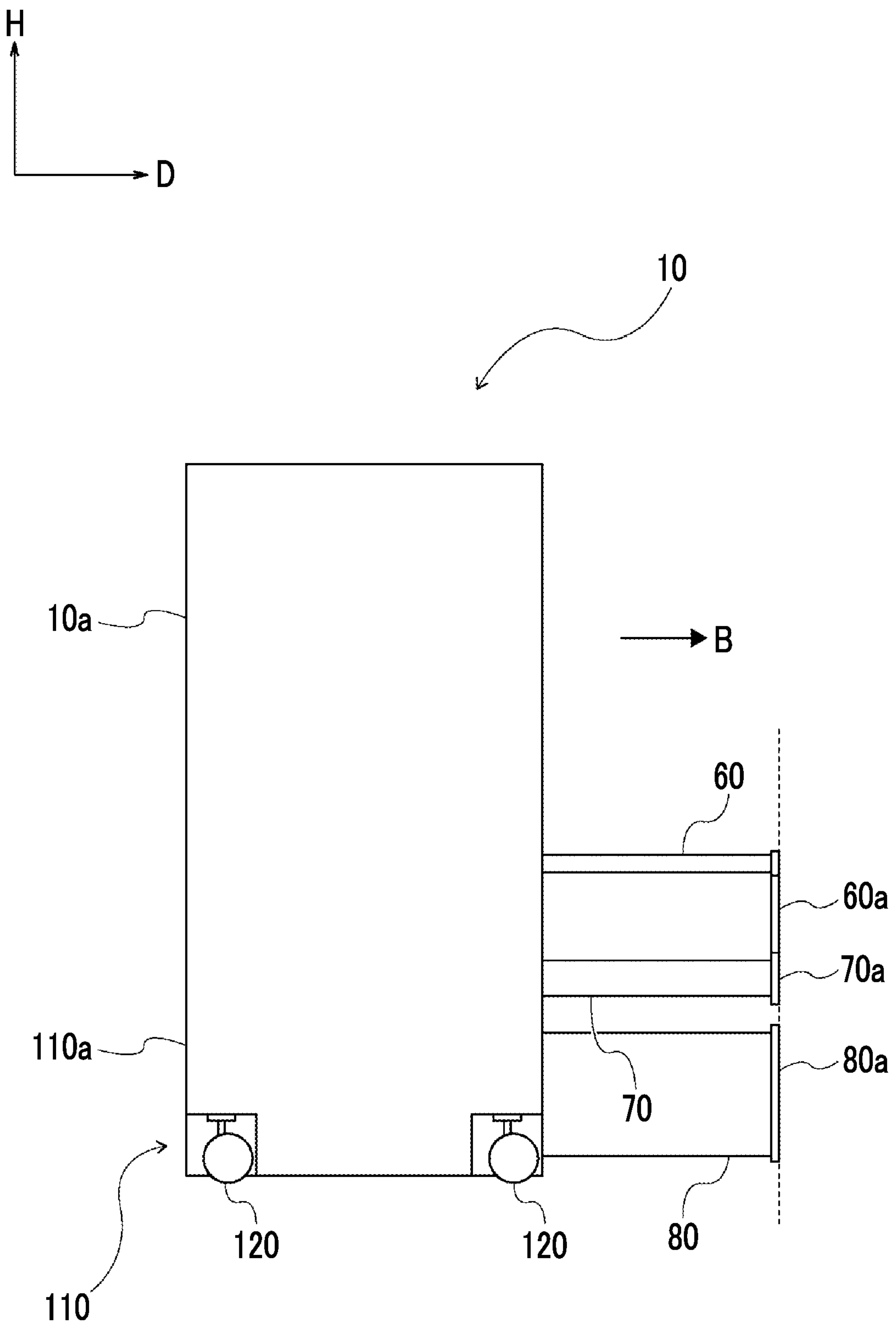
FIG. 10 is a side view showing a state where all of the accommodating units of the accommodating device are pulled out according to the exemplary embodiment of the present invention.

As described above, the accommodating device 110 includes, in addition to the accommodating unit 80 in the technique of the present invention, the other accommodating units 60 and 70 that can be pulled out in the same pulling direction B as in the accommodating unit 80. As shown in FIG. 10, all of the front surfaces 60*a*, 70*a*, and 80*a* of the accommodating unit 60, 70, and 80 are configured to be able to be pulled out to substantially the same position in the pulling direction B. The front surface of each accommodating unit is a front side surface of the accommodating unit, which faces the pulling direction B. In the present exemplary embodiment, the fact that all of the front surfaces 60*a*, 70*a*, and 80*a* of the accommodating units 60, 70, and 80 can be pulled out to substantially the same position in the pulling direction B may mean that the front surfaces 60*a*, 70*a*, and 80*a* can be practically pulled out to the same position, and that is, a state where a maximum error between the respective surfaces is allowed to be an error of approximately 1 cm, which is approximately the thickness of the front panel.

Operations of Accommodating Device 110 and Image Forming Apparatus 10

As described above, in the accommodating device 110, as for the two slide rails 88 and 89 fixed to both ends of the accommodating unit 80 in the apparatus width direction W respectively, the slide rail 89 fixed to the other side surface 80*d* of the accommodating unit 80 is fixed to a position higher than the slide rail 88 fixed to the one side surface 80*c* of the accommodating unit 80. Accordingly, compared to a case where slide rails are provided at the same height on both sides of the accommodating unit 80, a degree of freedom in providing the accommodating unit 80 including the slide rails 88 and 89 is increased after ensuring necessary attachment strength by identifying a centroid position or identifying a withstanding load difference. In addition, since the degree of freedom in providing the accommodating unit 80 is high, the accommodating device 110 is easily miniaturized.

In a case where the slide rails 88 and 89 are fixed at heights different from each other at both ends of the accommodating unit 80 in the apparatus width direction W, a load is more likely to be applied to the slide rail 89 fixed to a higher position than the slide rail 88 fixed to a lower position. As described above, in a case where a load is not uniformly applied to the two slide rails 88 and 89 fixed to both ends of the accommodating unit 80 in the apparatus width direction W respectively and a load applied to the slide rail 89 on one side is larger, durability of an attachment portion of the accommodating unit 80 with respect to the accommodating device 110 may decrease.

For this reason, the accommodating unit 80 configured as described above is configured such that the centroid position is located on the one side surface 80*c* side with respect to the center CW in the apparatus width direction W. Accordingly, an increase in a load applied to the slide rail 89 is suppressed.

In addition, in the apparatus width direction W, the side wall of the one side surface 80*c* of the accommodating unit 80 is formed of a metal, and the side wall of the other side surface 80*d* is formed of a resin. Accordingly, an increase in a load applied to the slide rail 89 is suppressed.

In addition, the moving mechanism 86 is attached to a position closer to the slide rail 88 than the slide rail 89 in the apparatus width direction W. As described above, by arranging functional components of the accommodating unit 80, the centroid is brought closer to the slide rail 88 side.

In addition, the withstanding load of the slide rail 89 is configured to be higher than the withstanding load of the slide rail 88. Accordingly, compared to a case where the withstanding loads of the slide rails 88 and 89 are the same or the withstanding load of the slide rail 88 is higher than the withstanding load of the slide rail 89, the slide rail 88 is easily miniaturized and decreased in weight.

In addition, the number of metal sheets of the slide rail 89 is configured to be larger than the number of metal sheets of the slide rail 88. Accordingly, compared to a case where the number of metal sheets of the slide rail 89 is the same as the number of metal sheets of the slide rail 88 or is smaller than the number of metal sheets of the slide rail 88, it is easy to make the withstanding load of the slide rail 89 higher than the withstanding load of the slide rail 88.

In addition, in the apparatus width direction W, the width W2 of the slide rail 89 is configured to be larger than the width W1 of the slide rail 88. Accordingly, compared to a case where the width of the slide rail 89 is the same as the width of the slide rail 88 or is smaller than the width of the slide rail 88, it is easy to make the withstanding load of the slide rail 89 higher than the withstanding load of the slide rail 88.

In addition, the medium P accommodated in the accommodating unit 80 is transported from the one side surface 80*c* side of the accommodating unit 80 to the outside along the transport direction T parallel to the apparatus width direction W. Accordingly, compared to a case where the medium P is transported from the other side surface 80*d* side of the accommodating unit 80 to the outside, an increase in a load applied to the slide rail 89 in a case of transporting the medium P is suppressed.

In addition, it is assumed that the A4 medium P is used the most in the image forming apparatus 10. For this reason, in a case where the accommodating unit 80 of the present exemplary embodiment is configured to be capable of accommodating 1,000 sheets of the A4 media P, the weight of the accommodating unit 80 including the media P is extremely great in a state where the maximum number of sheets of the media P are accommodated in the accommodating unit 80. For this reason, in the present exemplary embodiment, the lower surface 80*f* of the accommodating unit 80 is configured to be located below the attachment surfaces 111*b* for the castors 120 in the apparatus up-down direction H. Accordingly, compared to a case where the lower surface 80*f* of the accommodating unit 80 is located above the attachment surfaces 111*b* for the castors 120, the centroid of the entire accommodating device 110 is lowered in a state where the medium P is accommodated in the accommodating unit 80.

In addition, the accommodating unit 80, the slide rail 88, and the castors 120 are arranged at positions overlapping each other in the apparatus up-down direction H. That is, the accommodating unit 80 is arranged in a form of being interposed between the castors 120 on both sides in the apparatus width direction W. Accordingly, compared to a case where the accommodating unit 80, the slide rail 88, and the castors 120 are arranged at positions different from each other in the apparatus up-down direction H, the centroid of the entire accommodating device 110 is lowered in a state where the medium P is accommodated in the accommodating unit 80. In addition, in such a case, by fixing the slide rail 89 at a position not interposed between the castors 120, an increase in the length of the apparatus width direction W can be suppressed compared to a case where the slide rails 88 and 89 on both sides of the accommodating unit 80 are fixed at positions interposed between the castors 120.

In addition, the accommodating device 110 includes, in addition to the accommodating unit 80 in the technique of the present invention, the other accommodating units 60 and 70 that can be pulled out in the same pulling direction B as in the accommodating unit 80. All of the front surfaces 60*a*, 70*a*, and 80*a* of the accommodating unit 60, 70, and 80 are configured to be able to be pulled out to substantially the same position in the pulling direction B. Accordingly, in a case of including a plurality of accommodating units, beauty of the apparatus appearance and safety in a state where all of the accommodating units are pulled out are improved compared to a case where the front surfaces of the accommodating units are at positions different from each other in a state where all of the accommodating units are pulled out.

In addition, compared to a case where the accommodating device 110 is not included in the image forming apparatus 10, a range necessary in a case of supplying the medium P to the image forming apparatus 10 is decreased.

Although details of a certain exemplary embodiment of the present invention have been described, the present invention is not limited to such an exemplary embodiment, and it is clear for those skilled in the art that the present invention can take other various exemplary embodiments within the scope of the present invention.

For example, although the accommodating device 110 is used in the image forming apparatus 10 adopting the electrophotographic method in the exemplary embodiment, for example, the accommodating device 110 may be used in an image forming apparatus adopting an inkjet method. In addition, the accommodating device is not limited to being applied to the image forming apparatus and may be applied to an optional device such as a paper feeding device.

In addition, an arrangement position, an arrangement inclination state, a shape, a size, and a maximum pulling amount with respect to the device body 110*a* of the accommodating device 110 of each of the accommodating unit 60, the accommodating unit 70, and the accommodating unit 80 are not limited to the exemplary embodiment. In addition, although the accommodating device 110 includes the accommodating unit 60, the accommodating unit 70, and the accommodating unit 80 in the exemplary embodiment, the accommodating unit 60 and the accommodating unit 80 may not be included. In this case, operations achieved by including the accommodating unit 60 and the accommodating unit 80 cannot be achieved.

In addition, the accommodating device 110 may be provided with an openable and closable cover covering the accommodating unit 60, the accommodating unit 70, and the accommodating unit 80.

In addition, the slide rail 88 is not limited to being configured by three members including the outer member 88*a* attached to the device body 110*a* of the accommodating device 110, the intermediate member 88*b*, and the inner member 88*c* attached to the accommodating unit 80, and other forms may be adopted. For example, the slide rail 88 may be configured by two members including a guide member attached to the device body 110*a* of the accommodating device 110 and a guided member attached to the accommodating unit 80. In addition, a member of the slide rail 88, which is attached to the device body 110*a* of the accommodating device 110, may be configured to be integrated with the device body 110*a*. Similarly, a member of the slide rail 88, which is attached to the accommodating unit 80, may be configured to be integrated with the accommodating unit 80.

In addition, also the slide rail 89 may be in another form, similar to the slide rail 88. In addition, the slide rail 88 and the slide rail 89 are not limited to having structures different from each other as in the exemplary embodiment and may have the same structure. In addition, the expanding and contracting member is not limited to the slide rail and may be another mechanism such as an air cylinder.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An accommodating device comprising:

a device body;

an accommodating unit that is movable to a supply position where a user is able to supply a medium by being pulled out from the device body in a pulling direction and of which a centroid position is located on one side surface side with respect to a center in an intersecting direction with the pulling direction;

a first expanding and contracting member that expands and contracts to connect the accommodating unit to the device body so as to be able to be pulled out and is fixed to one side surface of the accommodating unit in the intersecting direction; and a second expanding and contracting member that expands and contracts to connect the accommodating unit to the device body so as to be able to be pulled out and is fixed at a position higher than the first expanding and contracting member on the other side surface of the accommodating unit in the intersecting direction.

2. The accommodating device according to claim 1, wherein in the intersecting direction, a side wall of the accommodating unit on a first expanding and contracting member attachment side is formed of a metal, and a side wall of the accommodating unit on a second expanding and contracting member attachment side is formed of a resin.

3. The accommodating device according to claim 1, wherein the accommodating unit includes, at a position closer to the first expanding and contracting member than the second expanding and contracting member in the intersecting direction, a moving mechanism for moving the medium accommodated in the accommodating unit upward in a vertical direction.

4. The accommodating device according to claim 2, wherein the accommodating unit includes, at a position closer to the first expanding and contracting member than the second expanding and contracting member in the intersecting direction, a moving mechanism for moving the medium accommodated in the accommodating unit upward in a vertical direction.

5. The accommodating device according to claim 1, wherein a withstanding load of the second expanding and contracting member is higher than a withstanding load of the first expanding and contracting member.

6. The accommodating device according to claim 2, wherein a withstanding load of the second expanding and contracting member is higher than a withstanding load of the first expanding and contracting member.

7. The accommodating device according to claim 3, wherein a withstanding load of the second expanding and contracting member is higher than a withstanding load of the first expanding and contracting member.

8. The accommodating device according to claim 4, wherein a withstanding load of the second expanding and contracting member is higher than a withstanding load of the first expanding and contracting member.

9. An accommodating device comprising:

a device body;

an accommodating unit that is movable to a supply position where a user is able to supply a medium by being pulled out from the device body in a pulling direction;

a first expanding and contracting member that expands and contracts to connect the accommodating unit to the device body so as to be able to be pulled out and is fixed to one side surface of the accommodating unit in an intersecting direction with the pulling direction; and a second expanding and contracting member that expands and contracts to connect the accommodating unit to the device body so as to be able to be pulled out, has a withstanding load higher than a withstanding load of the first expanding and contracting member, and is fixed at a position higher than the first expanding and contracting member on the other side surface of the accommodating unit in the intersecting direction.

10. The accommodating device according to claim 5, wherein the number of metal sheets of the second expanding and contracting member is larger than the number of metal sheets of the first expanding and contracting member.

11. The accommodating device according to claim 6, wherein the number of metal sheets of the second expanding and contracting member is larger than the number of metal sheets of the first expanding and contracting member.

12. The accommodating device according to claim 7, wherein the number of metal sheets of the second expanding and contracting member is larger than the number of metal sheets of the first expanding and contracting member.

13. The accommodating device according to claim 8, wherein the number of metal sheets of the second expanding and contracting member is larger than the number of metal sheets of the first expanding and contracting member.

14. The accommodating device according to claim 5, wherein in the intersecting direction, a width of the second expanding and contracting member is larger than a width of the first expanding and contracting member.

15. The accommodating device according to claim 9, wherein the accommodating unit has a centroid position located on one side surface side with respect to a center in the intersecting direction.

16. The accommodating device according to claim 1, wherein the medium accommodated in the accommodating unit is transported from the one side surface side of the accommodating unit to an outside.

17. The accommodating device according to claim 1, wherein a castor is attached to a lower surface of the device body, and in a vertical direction, a lower surface of the accommodating unit is located below an attachment surface for the castor.

18. The accommodating device according to claim 17, wherein the accommodating unit, the first expanding and contracting member, and the castor are arranged at positions overlapping each other in the vertical direction.

19. The accommodating device according to claim 1, further comprising:

at least one or more other accommodating units that are able to be pulled out from the device body in the pulling direction and are different from the accommodating unit, wherein front side surfaces of all of the accommodating units in the pulling direction are configured to be able to be pulled out to substantially the same position in the pulling direction.

20. An image forming apparatus comprising:

the accommodating device according to claim 1; and an image forming unit that forms an image on a medium, which is accommodated in the accommodating device and is transported.

* * * * *